(12) United States Patent
Choi et al.

(10) Patent No.: US 8,325,277 B2
(45) Date of Patent: Dec. 4, 2012

(54) DISPLAY APPARATUS AND DATA DISPLAY METHOD FOR DISPLAYING A FORMAT MISMATCH MESSAGE

(75) Inventors: Yeon-jung Choi, Suwon-si (KR); Dong-il Mo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1146 days.

(21) Appl. No.: 11/765,566

(22) Filed: Jun. 20, 2007

(65) Prior Publication Data

US 2008/0068391 A1 Mar. 20, 2008

(30) Foreign Application Priority Data

Sep. 14, 2006 (KR) .................. 10-2006-0088959

(51) Int. Cl.
*H04N 3/27* (2006.01)
(52) U.S. Cl. ........ 348/554; 348/553; 348/563; 348/569; 348/570; 348/725; 348/731; 348/732; 348/733; 725/42; 725/135; 725/86; 725/63; 725/68; 370/486; 370/487
(58) Field of Classification Search .................. 348/563, 348/569, 570, 725, 731, 732, 733, 553
See application file for complete search history.

(56) References Cited

U.S. PATENT DOCUMENTS

| | | | |
|---|---|---|---|
| 5,453,796 A * | 9/1995 | Duffield et al. | 348/565 |
| 6,738,559 B1 * | 5/2004 | Yoo et al. | 386/231 |
| 7,120,167 B1 | 10/2006 | Yamamuro et al. | |
| 7,596,188 B2 * | 9/2009 | Gotanda et al. | 375/316 |
| 2003/0011712 A1 * | 1/2003 | Matey | 348/565 |
| 2004/0090556 A1 * | 5/2004 | Kamieniecki et al. | 348/558 |
| 2004/0177382 A1 * | 9/2004 | Choi | 725/135 |
| 2004/0263687 A1 * | 12/2004 | Muramatsu | 348/558 |
| 2005/0073609 A1 | 4/2005 | Lim et al. | |
| 2005/0193425 A1 * | 9/2005 | Sull et al. | 725/135 |
| 2006/0007359 A1 * | 1/2006 | Douangphachanh | 348/554 |
| 2006/0015908 A1 * | 1/2006 | Vermola et al. | 725/63 |
| 2006/0036750 A1 | 2/2006 | Ladd | |
| 2006/0053467 A1 * | 3/2006 | Ikeda | 725/134 |
| 2006/0077298 A1 * | 4/2006 | Gotanda et al. | 348/558 |

(Continued)

FOREIGN PATENT DOCUMENTS

EP 1437893 A1 7/2004

(Continued)

OTHER PUBLICATIONS

Office Action issued in a corresponding CN Patent Application No. 200710143098, on Jun. 2, 2010, together with English translation of at least pertinent portions.

(Continued)

*Primary Examiner* — Jefferey Harold
*Assistant Examiner* — Sam Huang
(74) *Attorney, Agent, or Firm* — Sughrue Mion, PLLC

(57) ABSTRACT

A display apparatus includes a display; a receiver which receives a broadcasting signal including a program with a data format; an image processing part which processes the received program according to an available data format; and a controller which controls the image processing part to display a message informing that both data formats are not matched on the display if the data format of the received program is not matched with the available data format to be processed by the image processing part.

15 Claims, 4 Drawing Sheets

U.S. PATENT DOCUMENTS

2006/0080474 A1* 4/2006 Horii et al. .................. 710/8
2006/0187339 A1* 8/2006 Kong ...................... 348/423.1

FOREIGN PATENT DOCUMENTS

| JP | 7-264434 A | | 10/1995 |
|---|---|---|---|
| JP | 2001-054082 | * | 2/2001 |
| JP | 2001-054082 A | | 2/2001 |
| JP | 2004-187216 A | | 7/2004 |
| KR | 10-2004-0103194 A | | 12/2004 |

OTHER PUBLICATIONS

Communication dated Mar. 9, 2012 issued in the European Patent Office in corresponding European Application No. 07112990.2.
Communication issued Jul. 12, 2012 by the European Patent Office in counterpart European Application No. 07112990.2.

* cited by examiner

DISPLAY APPARATUS AND DATA DISPLAY METHOD FOR DISPLAYING A FORMAT MISMATCH MESSAGE

CROSS-REFERENCE TO RELATED APPLICATIONS

This application claims priority from Korean Patent Application No. 2006-0088959, filed on Sep. 14, 2006 in the Korean Intellectual Property Office, the disclosure of which is incorporated herein by reference.

BACKGROUND OF THE INVENTION

1. Field of Invention

Apparatuses and methods consistent with the present invention relate to a display apparatus, and more particularly, to displaying an image according to a data format of a received program.

2. Description of the Related Art

A related art display apparatus receives a broadcasting signal transmitted from a broadcasting station to display viewable images. As digital broadcasting has started in the related art, it is possible to receive a data broadcasting channel among channels of broadcasting signals. The data broadcasting channel is a channel to display images by data instead of a video signal, and displays images about how to use an application, channel information, weather information, etc., which are in the broadcasting signals.

The data broadcasting channel includes a related art data format such as Advanced Common Application Platform (ACAP), Open Cable Application Platform (OCAP), Multimedia and Hypermedia information coding Experts Group (MHEG), Multimedia Home Platform (MHP), etc. The display apparatus extracts data from the received broadcasting signals and displays only a broadcasting signal of a data format matched with a predetermined data format.

However, if the data format of the received data broadcasting is not matched with an available data format which the display apparatus can process, nothing is displayed. Thus, a user who does not have information on the data format may be confused.

SUMMARY OF THE INVENTION

The present invention provides a display apparatus and a data display method thereof which provides information for unmatched data if a data format of received data broadcasting is not matched with an available data format that the display apparatus is capable of processing, and which allows a user to select only a channel of a program with a matched data format.

According to an aspect of the present invention, there is provided a display apparatus comprising: a display; a receiver which receives a broadcasting signal including a program with a data format; an image processing part which processes the received program according to an available data format; and a controller which controls the image processing part to display a message informing that both data formats are not matched on the display if the data format of the received program is not matched with the available data format to be processed by the image processing part.

According to another aspect of the invention, the controller generates a channel list with the available data format to be processed by the image processing part and controls the image processing part to select a channel in the channel list.

According to another aspect of the invention, the controller controls the image processing part to display the channel list on the display.

According to another aspect of the invention, the image processing part further comprises a filter part to process received data from the broadcasting signal having a format matched with the available data format to be processed by the image processing part and process the data processed by the filter part to be displayed on the display.

According to another aspect of the invention, the available data format of the image processing part comprises one of ACAP, OCAP, MHEG and MHP.

According to another aspect of the present invention, there is provided a display apparatus comprising: a display; a receiver which receives a broadcasting signal including a program with a data format; an image processing part which processes the received program according to an available data format; and a controller which generates a channel list having channels with the available data format to be processed by the image processing part and controls the image processing part to select a channel in the channel list.

According to another aspect of the invention, the display apparatus further comprises a storing part, wherein the controller stores the channel list in the storing part so as to select a channel from the channel list.

According to another aspect of the invention, the display apparatus further comprises a user input part; and a user interface generating part which generates a user interface corresponding to the channel list, wherein the controller receives a channel selection from the user input part through the user interface.

According to another aspect of the invention, the image processing part further comprises a filter part to process received data from the broadcasting signal having a format matched with the available data format to be processed by the image processing part and process the data processed by the filter part to be displayed on the display.

According to another aspect of the invention, the available data format of the image processing part comprises one of ACAP, OCAP, MHEG and MHP.

According to another aspect of the present invention, there is provided a data display method of a display apparatus comprising a display, comprising: receiving a broadcasting signal which comprises a program including a data format; determining whether a data format of the program is matched with an available data format to display an image on the display; and displaying a message informing that both data formats are not matched with each other on the display if the data format is determined to be unmatched with the available data format.

According to another aspect of the invention, the data display method of the display apparatus further comprises generating a channel list having channels with the available data format which can be displayed on the display, and displaying an image corresponding to a channel selected from the channel list on the display.

According to another aspect of the invention, the available data format to display an image on the display comprises one of ACAP, OCAP, MHEG and MHP.

The foregoing and/or other aspects can be achieved by providing a data display method of a display apparatus comprising a display and an image processing part, comprising: receiving a broadcasting signal which comprises a program including a data format; generating a channel list having channels with an available data format which the image processing part is capable of processing; and displaying an image corresponding to a channel selected from the channel list on the display.

According to an aspect, the available data format to display an image on the display comprises one of ACAP, OCAP, MHEG and MHP.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
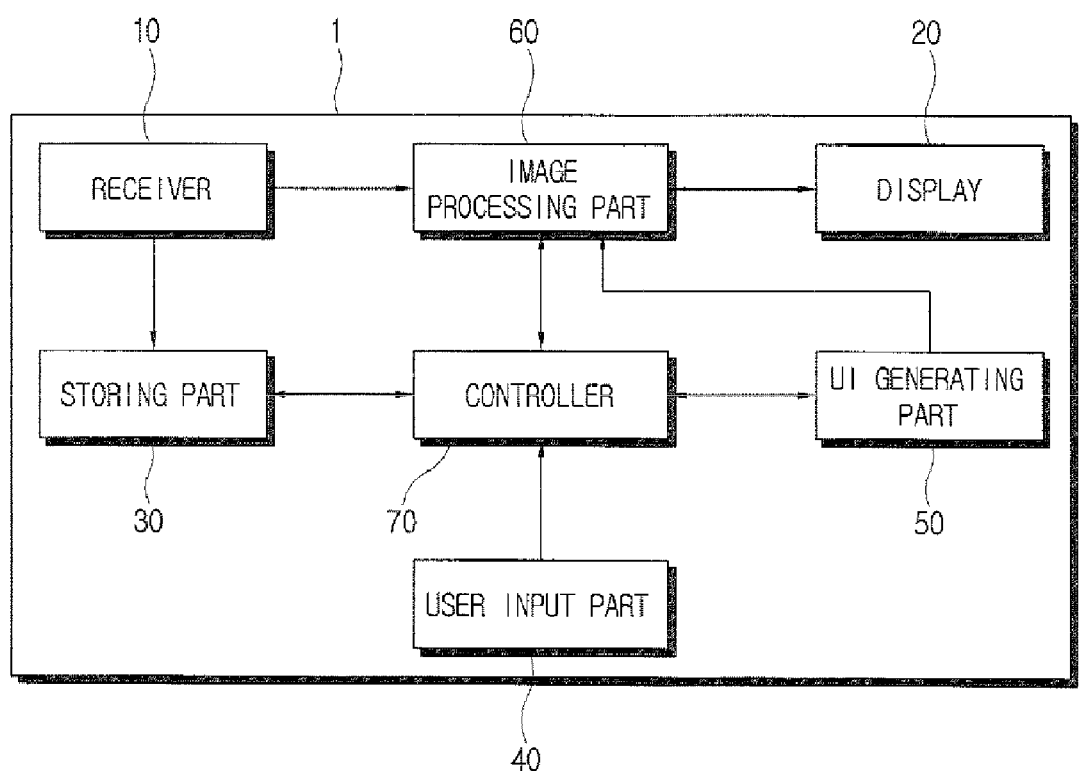
FIGS. 1 and 2 are block diagrams to illustrate a configuration of a display apparatus according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Figure 2:
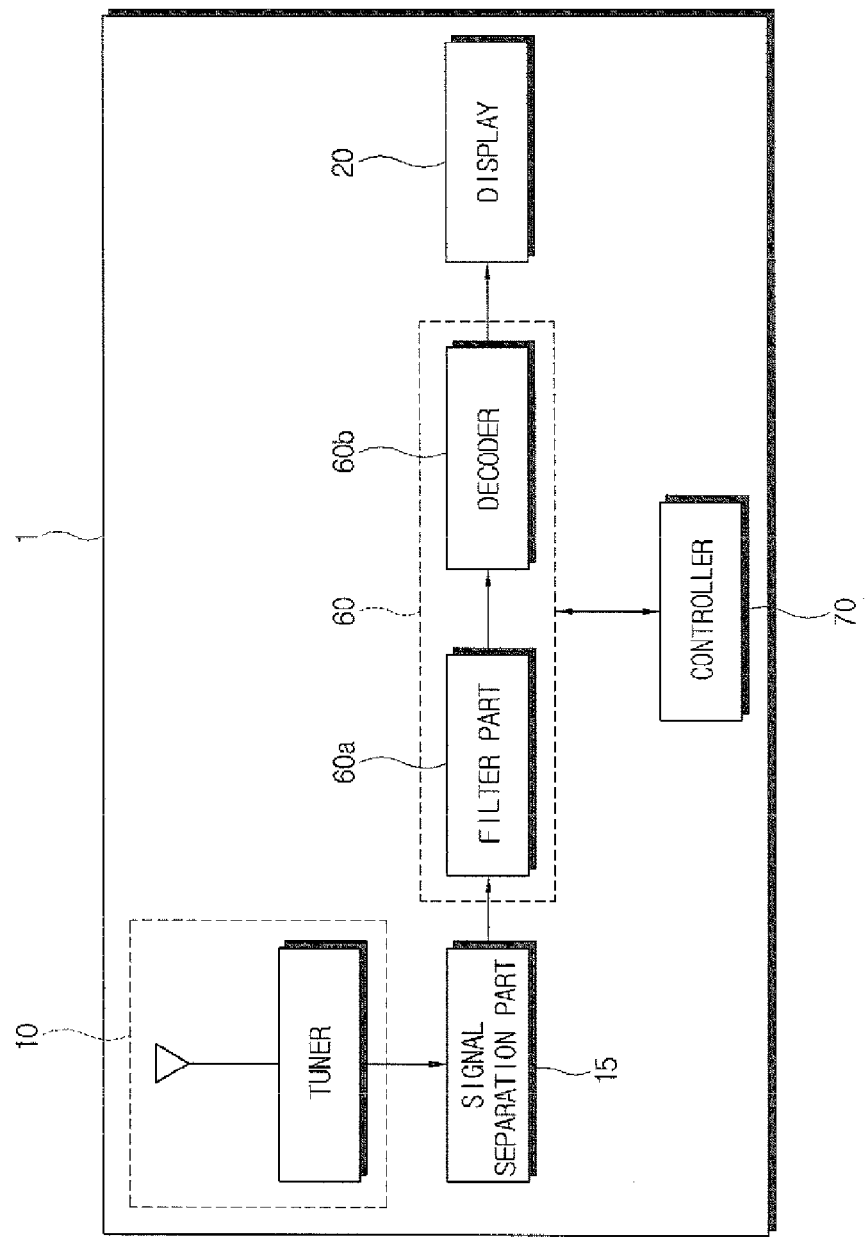

Referring to FIGS. 1 and 2, a display apparatus 1 according to an exemplary embodiment of the present invention includes a receiver 10, a signal separation part 15, a display 20, a storing part 30, a user input part 40, a user interface (UI) generating part 50, an image processing part 60 and a controller 70. The display apparatus 1 according to the exemplary embodiment may be provided as a digital television (TV) which receives data broadcasting and displays it, for example, but not by way of limitation.

The receiver 10 receives a broadcasting signal which includes a program having a data format. The receiver 10 may be provided as a tuner, but is not limited thereto.

The signal separation part 15 separates the broadcasting signal, which the receiver 10 receives, into a video signal, an audio signal and a data signal by a stream unit of each channel with the same program identifier (ID). The broadcasting signal includes Program Specific Information (PSI). Service information in the PSI includes digital television service, teletext service, FM radio, data broadcasting service, etc. The signal separation part 15 extracts and transmits data broadcasting service information to a filter part 60a. In the exemplary embodiment, the signal separation part 15 may be provided as a demultiplexer (Demux), but is not limited thereto.

The display 20 displays images based on a video signal which is processed by the image processing part 60. The display 20 may include a cathode ray tube (CRT), a liquid crystal display (LCD), a plasma display panel (PDP), a digital light processing (DLP) device, a surface-conduction electron-emitter display (SED), a field emission display (FED), etc., but is not limited thereto.

The storing part 30 stores a channel list with an available data format which the image processing part 60 is capable of processing by control of the controller 70. The storing part 30 may include a memory stick, an Electrically Erasable Programmable Read Only Memory (EEPROM), etc., but is not limited thereto.

The user input part 40 selects one of channels in the channel list with the available data format which the image processing part 60 is capable of processing. The user input part 40 includes a channel selection key and may be disposed on one side of the display apparatus 1 or on a remote controller or the like.

The UI generating part 50 generates a UI image corresponding to a message to inform the user that a data format of a received program is not matched with the available data format which the image processing part 60 is capable of processing, if the data format of the received program are not matched for the available data format which the image processing part 60 is capable of processing. Further, the UI generating part 50 may generate a UI corresponding to the channel list with the data format which the image processing part 60 is capable of processing.

The image processing part 60 processes the program received through the receiver 10 according to the available data format. In the exemplary embodiment, the image processing part 60 includes the filter part 60a and a decoder 60b.

The filter part 60a processes a data signal from the received broadcasting signal with a format matched with the available data format which the image processing part 60 is capable of processing. The filter part 60a detects the stream type of data transmitted from the signal separation part 15 and extracts the data format which the image processing part 60 is capable of processing from the data, if service information in the PSI is the data broadcasting service.

The data format includes ACAP, OCAP, MHEG and MHP. The ACPA and OCAP are standards which are used for the data broadcasting in the USA and in Korea. The MHEG standard is mostly used in England, and the MHP is mostly used in Europe except England.

The display apparatus 1 according to the exemplary embodiment may process signals for data broadcasting by one of the foregoing data formats. Here, the filter part 60a transmits a data signal with a data format corresponding to the available data format which the image processing part 60 is capable of processing to the decoder 60b.

The decoder 60b decodes a data signal transmitted from the filter part 60a in a form possible to output to the display 20.

The controller 70 controls the image processing part 60 to display a message to inform the user that a data format of a received program by the receiver 10 is unmatched, if the data format of the received program are not matched with the available data format which the image processing part 60 is capable of processing. The controller 70 may include a microcomputer, a software program, etc., but is not limited thereto.

The controller 70 controls the image processing part 60 to display the appropriate UI image generated by the UI generating part 50 on the display 20, if a data signal is not transmitted to the decoder 60b by the filter part 60a as the data format of the received broadcasting signal does not match with the available data format which the image processing part 60 is capable of processing.

The controller 70 generates a channel list having channels with a matched data format and controls the image processing part 70 to select a channel in the channel list, if a data format of a received broadcasting signal is not matched for the data format which the image processing part 60 is capable of processing.

Figure 3:
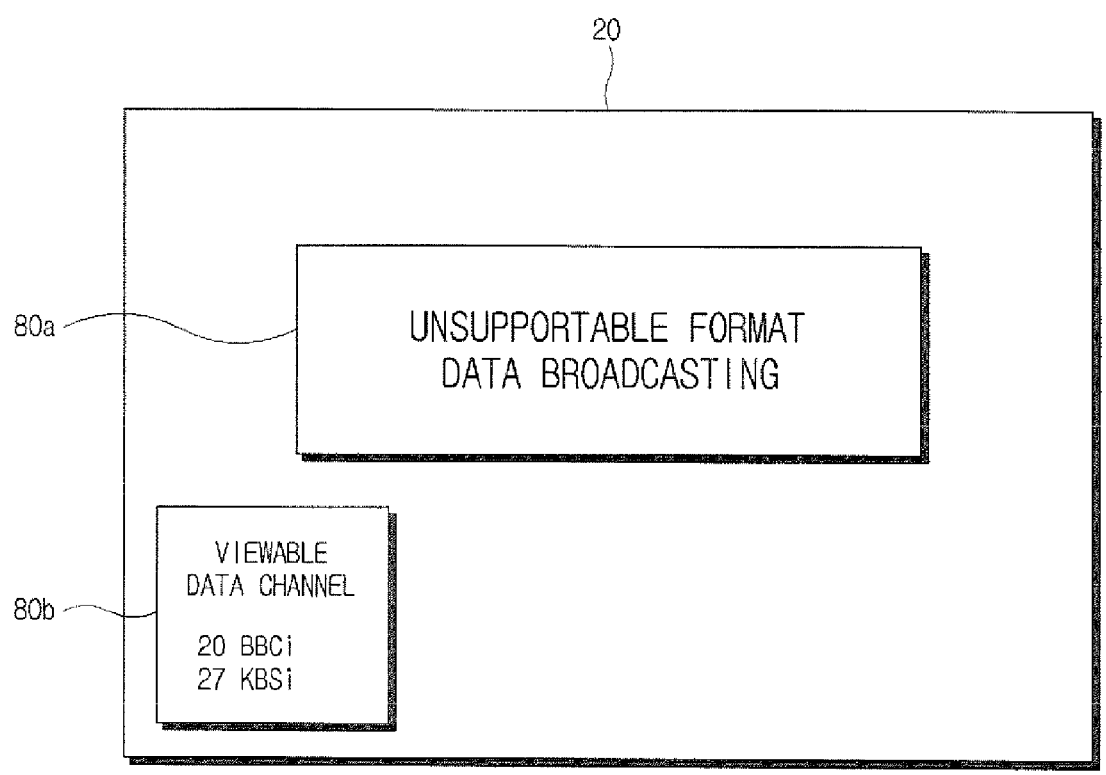
FIG. 3 illustrates a user interface of the display apparatus according to the exemplary embodiment of the present invention.

Hereinafter, the user interface of the display apparatus 1 according to the exemplary embodiment will be described with reference to FIG. 3. The user interface includes an interface 80a to indicate that a data format is not matched with the available data format which the image processing part 60 is capable of processing, and a user interface 80b to show the channel list having channels with the matched data format.

The controller 70 controls the image processing part 60 to display an interface image about a message to inform the user that a data signal of the received broadcasting signal is an unmatched data format on the display 20 if a data format of a received data broadcasting signal is not matched with the available data format which the image processing part 60 is capable of processing. Thus, if the display apparatus 1 receives a program of a data format which cannot be processed by the image processing part 60, information that the program of the data format cannot be processed is provided to the user.

The controller 70 generates a channel list of received broadcasting signals having format matched for the available data format which the image processing part 60 is capable of processing so that the user selects only one of the channels in the channel list, thereby preventing a selection of a channel having data broadcasting with an unmatched data format from being selected.

If a key in the user input part 40 is inputted, the controller 70 controls the image processing part 60 to display the user interface 80b showing the channel list having the matched data format on the display 20. Thus, the user may select one of viewable channels of the digital broadcasting through the user input part 40.

Figure 4:
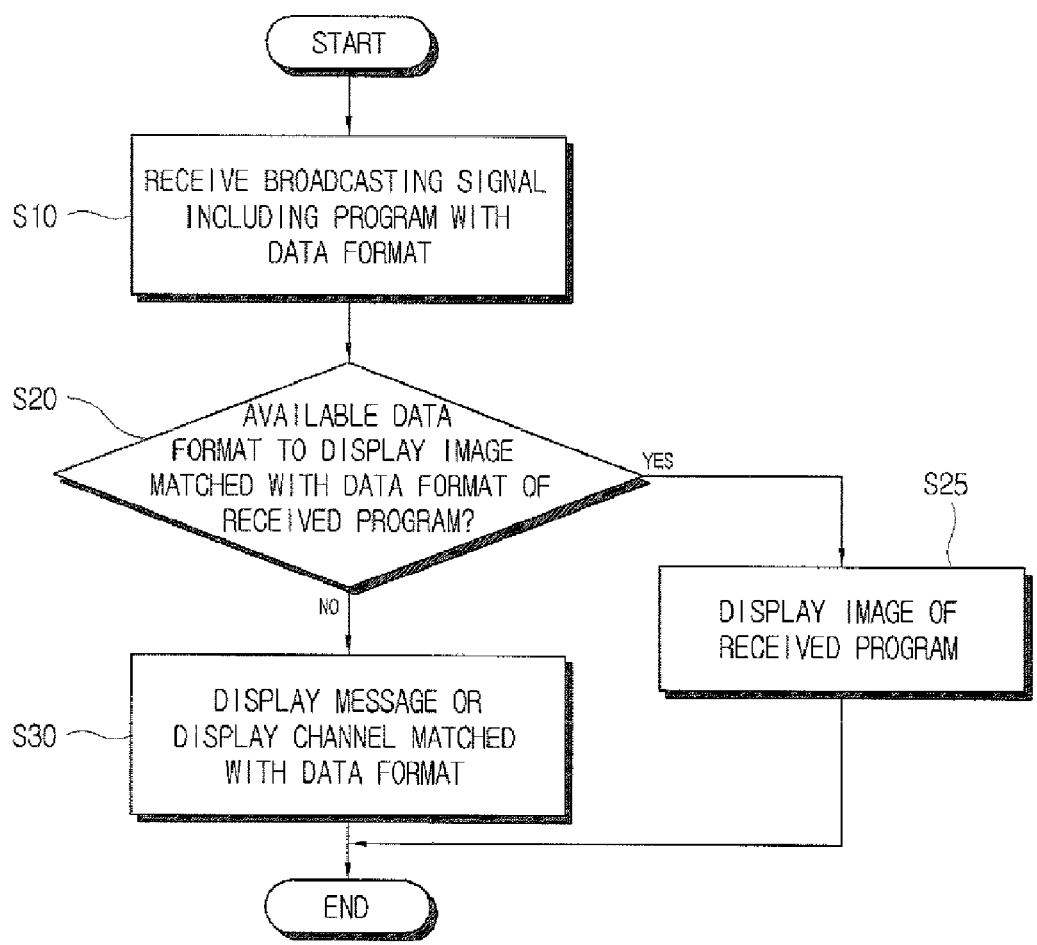
FIG. 4 is a flow chart to illustrate a data display method of the display apparatus according to the exemplary embodiment of the present invention.

Hereinafter, a data display method of the display apparatus 1 according to the exemplary embodiment will be described with reference to FIG. 4.

The controller 70 receives a broadcasting signal including a program with a data format (operation S10). The filter part 60a determines whether the data format of the program received at operation S10 is matched with the available data format which may be processed in the image processing part 60 to display an image (operation S20).

If the data format is not matched, the controller 70 controls the image processing part 60 to display a message informing that the data format of the received program is not matched on the display 20 (operation S30). If the data format is matched, the controller 70 controls the image processing part 60 to display an image corresponding to the received program on the display 20 (operation S25). Thus, if the display apparatus 1 receives a program of a data format which can not be processed in the image processing part 60, it provides information that the program cannot be processed.

The controller 70, at operation S30, further includes an operation to generate a channel list having channels with the matched data format and an operation to display an image corresponding to a channel selected from the channel list on the display 10. Accordingly, the user may select only digital broadcasting channels possible to be displayed.

As described above, a display apparatus and a data display method thereof displays information that a program can not be processed on a screen if the display apparatus receives a program of a data format which cannot be processed, which may prevent a user from being confused.

Further, the display apparatus displays only a channel with a data format which can be processed, and thus a user may conveniently watch data broadcasting.

Although exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
   a display;
   a receiver which receives a broadcasting signal including a program of a data broadcasting channel having a first data format;
   a signal separation part which separates said broadcasting signal into video, audio and data components;
   an image processing part which is capable of processing programs having second data formats which are data formats of data broadcasting channels, and includes:
      a filter part which receives the data component separated from the broadcasting signal and determines whether the first data format matches one of the second data formats, and
      a decoder which decodes a separated data component into a viewable image, when it is determined that the first data format matches one of the second data formats; and
   a controller which controls the image processing part to display a message indicative of a format mismatch on the display if the first data format does not match any of the second data formats,
   wherein the controller generates a channel list of channels including one or more channels having the second data format and controls the image processing part to display the channel list on the display for selecting a channel in the channel list.

2. The display apparatus according to claim 1, wherein the second data format comprises one of Advanced Common Application Platform (ACAP), Open Cable Application Platform (OCAP), Multimedia and Hypermedia information coding Experts Group (MHEG) and Multimedia Home Platform (MHP).

3. The display apparatus according to claim 1, wherein the signal separation part extracts data broadcasting service information included into a program specific information (PSI) received in the broadcasting signal, and
   the filter part determines whether the first data format matches one of the second data formats based on an extracted data broadcasting service information.

4. The display apparatus according to claim 3, wherein
   the controller generates the channel list when the filter part determines that the first data format does not match any of the second data formats, to prevent a selection of the data broadcasting channel having the format mismatch.

5. A display apparatus comprising:
   a display;
   a receiver which receives a broadcasting signal including a program of a data broadcasting channel having a first data format;
   a signal separation part that separates said broadcasting signal into video, audio and data components;
   an image processing part which is capable of processing programs having second data formats which are data formats of data broadcasting channels, and includes:
      a filter part which receives a separated data component and determines whether the first data format matches one of the second data formats, and
      a decoder which decodes the separated data component into a viewable image when the first data format matches one of the second data formats; and
   a controller which generates a channel list having one or more channels with the second data format to be processed by the image processing part and controls the image processing part to select a channel in the channel list.

6. The display apparatus according to claim 5, further comprising a storing part, wherein the controller stores the channel list in the storing part to select a channel from the channel list.

7. The display apparatus according to claim 5, further comprising:
a user input part; and
a user interface generating part which generates a user interface corresponding to the channel list, wherein the controller receives a channel selection from the user input part through the user interface.

8. The display apparatus according to claim 5, wherein the second data format comprises one of Advanced Common Application Platform (ACAP), Open Cable Application Platform (OCAP), Multimedia and Hypermedia information coding Experts Group (MHEG) and Multimedia Home Platform (MHP).

9. The display apparatus according to claim 5, wherein the signal separation part extracts data broadcasting service information included into a program specific information (PSI) received in the broadcasting signal, and
the filter part determines whether the first data format matches one of the second data formats based on an extracted data broadcasting service information.

10. The display apparatus according to claim 9, wherein the controller generates the channel list when the filter part determines that the first data format does not match any of the second data formats, to prevent a selection of the data broadcasting channel having the format mismatch.

11. A data display method of a display apparatus comprising a display, the data display method comprising:
receiving a broadcasting signal which comprises a program of a data broadcasting channel including a first data format;
separating said broadcasting signal into video, audio and data components;
determining whether the first data format of the data component is matched with one of second data formats which are data formats of data broadcasting channels that can be processed by the display apparatus to display an image on the display;
decoding the data component into a viewable image, when it is determined that the first data format matches one of the second data formats;
displaying a message indicative of a data format mismatch on the display if the first data format is determined to be mismatched with the second data formats;
generating a channel list having channels having the second data formats which can be decoded and displaying the channel list on the display; and
displaying an image corresponding to a channel selected from the channel list on the display.

12. The data display method of the display apparatus according to claim 11, wherein the second data format to display an image on the display comprises one of Advanced Common Application Platform (ACAP), Open Cable Application Platform (OCAP), Multimedia and Hypermedia information coding Experts Group (MHEG) and Multimedia Home Platform (MHP).

13. A non-transitory computer-readable medium having a software program recorded thereon which software program when executed by a computer causes the computer to perform said method of claim 11.

14. A data display method of a display apparatus comprising a display and an image processing part, the data display method comprising:
receiving a broadcasting signal which comprises a program of a data broadcasting channel including a first data format;
separating said received broadcasting signal into video, audio and data components;
receiving a separated data component and determining whether the first data format matches one of second data formats that are data formats of data broadcasting channels that the image processing part is capable of processing;
decoding the separated data component into a viewable image when the first data format matches one of the second data formats;
generating a channel list having channels with a having the second data format formats which the image processing part is capable of processing; and
displaying an image corresponding to a channel selected from the channel list on the display.

15. The data display method of the display apparatus according to claim 14, wherein the second data format to display an image on the display comprises one of Advanced Common Application Platform (ACAP), Open Cable Application Platform (OCAP), Multimedia and Hypermedia information coding Experts Group (MHEG) and Multimedia Home Platform (MHP).

* * * * *